United States Patent [19]
Jackett et al.

[11] Patent Number: 4,862,428
[45] Date of Patent: Aug. 29, 1989

[54] DISTRIBUTED ARRAY HYDROPHONE

[75] Inventors: Stephen G. Jackett, Kenthurst; Stephen N. Kastel, Cranebrook; Zdenek Jandera, Ashfield, all of Australia

[73] Assignees: The Commonwealth of Australia, Canberra; Plessey Australia Pty. Limited, Meadowbank, both of Australia

[21] Appl. No.: 259,116
[22] PCT Filed: Nov. 17, 1987
[86] PCT No.: PCT/AU87/00386
§ 371 Date: Sep. 14, 1988
§ 102(e) Date: Sep. 14, 1988
[87] PCT Pub. No.: WO88/04131
PCT Pub. Date: Jun. 16, 1988

[30] Foreign Application Priority Data
Nov. 19, 1986 [AU] Australia ............................. PH9048

[51] Int. Cl.4 ........................................... H04R 17/00
[52] U.S. Cl. ................................... 367/155; 367/158; 367/162; 310/337

[58] Field of Search ...................... 310/322, 334, 337; 367/20, 106, 130, 153, 154, 155, 157, 158, 159, 162, 165, 167, 173, 176

[56] References Cited
U.S. PATENT DOCUMENTS

| 3,744,016 | 6/1973 | Davis | 174/101.5 |
|---|---|---|---|
| 4,017,824 | 4/1977 | Fife et al. | 367/157 |
| 4,160,229 | 7/1979 | McGough | 367/157 |
| 4,178,577 | 12/1979 | Cini et al. | 367/159 |
| 4,208,738 | 6/1980 | Lamborn | 367/157 |
| 4,733,379 | 3/1988 | Lopetina et al. | 367/20 X |
| 4,766,575 | 8/1988 | Ehrlich et al. | 367/153 |

FOREIGN PATENT DOCUMENTS 52-131761 11/1977 Japan .
1348401 3/1974 United Kingdom .

Primary Examiner—Brian S. Steinberger
Attorney, Agent, or Firm—Cushman, Darby & Cushman

[57] ABSTRACT

A distributed array hydrophone comprising an array of hydrophones each comprising a ceramic doublet assembly of hollow radially oppositely polarized members end held in a bobbin by decoupling means, the bobbins being linearly interconnected by semiflexible spacing members, the array being encapsulated in a vibration transmitting potting medium in a tube formed of a pressure-wave transmitting medium.

9 Claims, 2 Drawing Sheets

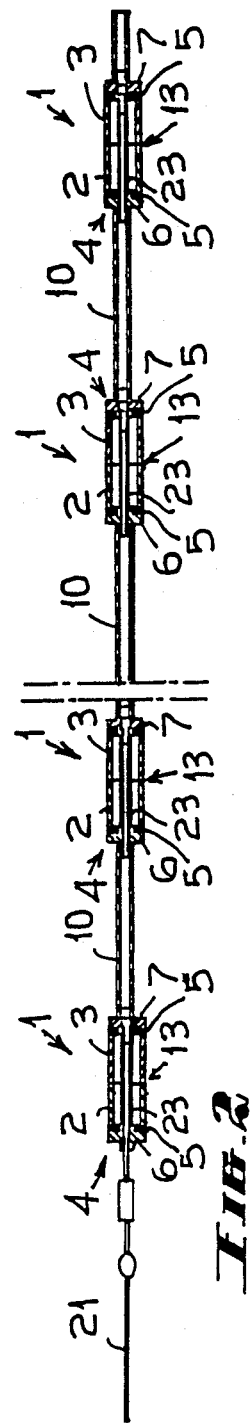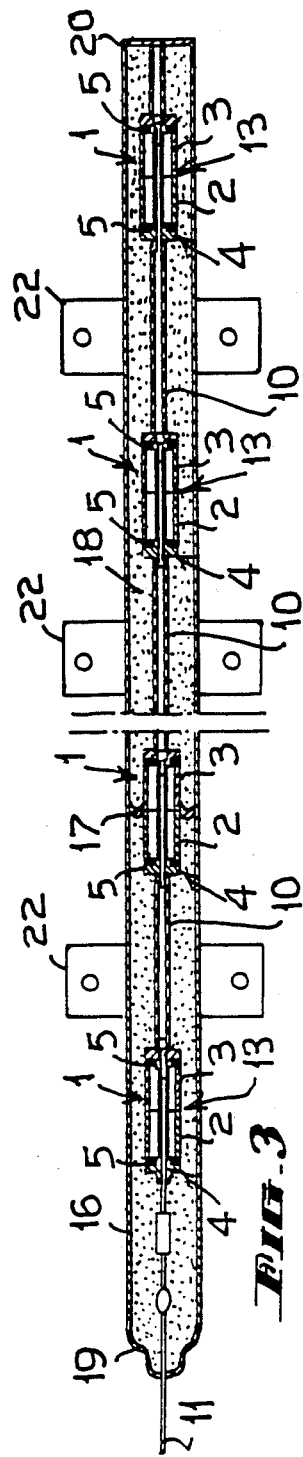

DISTRIBUTED ARRAY HYDROPHONE

This invention relates to a distributed array hydrophone and in particular it relates to a hydrophone which may be mounted on a submarine or the like for the purpose of receiving underwater signals.

This type of device is a passive array consisting of a number of individual hydrophone elements positioned at predetermined distances from each other and connected electrically in either series or parallel or a combination of series-parallel arrangements.

According to the system generally used on, for instance, submarines the arrays consisted of single elements connected by a flexible cable. This resulted in reliability problems when a cable entered and exited the hydrophone elements. The construction of the element itself was complicated as was the encapsulation process which involved the moulding of butyl rubber, and the outer tube required to have a series of polyethylene joins.

An improvement to this design was to have radially-poled ceramic tubes positioned at predetermined intervals along a stainless steel rod, the assembly being prestressed and followed by encapsulation in polyethylene using injection moulding techniques.

During development work it was found that the stiffness of a structure of this general type caused mechanical resonance within the stave which was within the required operating range of frequencies and attempts to decouple the ceramic from the structure proved unsuccessful. The object of this invention therefore is to provide a general assembly of this type but of a more successful nature free of the coupling referred to, in which assembly resonance problems are overcome by the design and in which greater effectiveness of the unit is attainable.

The design of this invention consists of individual ceramic elements which are fitted with end plates and these plates are decoupled from the ceramic by pressure release material, the element assemblies being connected together by using semiflexible spacers which accurately set the spacing of the elements and also house the wiring which connect the elements electrically, this sub-assembly being loaded into an extruded polyethylene or similar tube which has moulded to it an end cap and mounting feet and the elements are then encapsulated in a potting medium such as polyurethane.

To enable the invention to be fully appreciated reference may be had to the accompanying drawings in which,

BRIEF DESCRIPTION OF THE DRAWINGS

FIG. 2 is a sectional elevation of the hydrophone sub assembly embodying the ceramic doublet assemblies and, FIG. 3 is a sectional elevation of the complete array.

Figure 1:
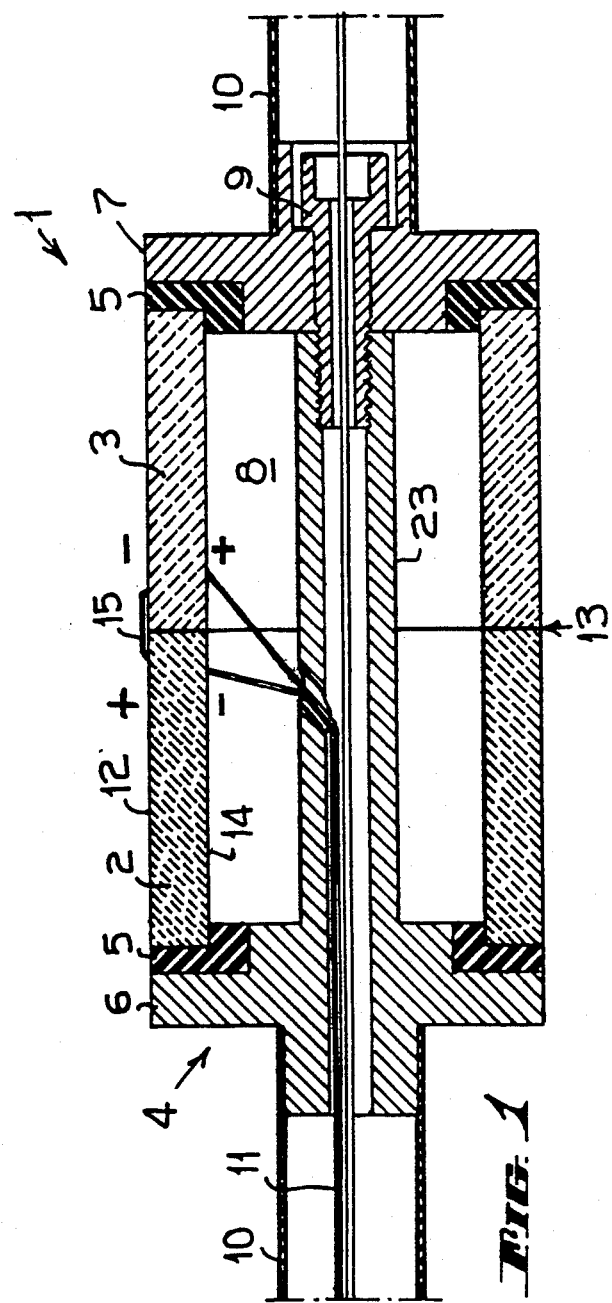
FIG. 1 illustrates in longitudinal section a ceramic doublet assembly.

Referring first to FIG. 1, it will be seen that the ceramic doublet assembly 1 comprises a pair of ceramic members 2-3 of tubular form which are radially oppositely polarized and held in a rigid bobbin 4 by interposed decoupling member 5 between end flanges 6-7 of the bobbin 4 and the ends of the ceramic doublet assembly 1, the signal being taken from the junction portion of the doublet assembly through an axial hollow 8 in the bobbin 4 or in any other means. The bobbin 4 is in two parts held together by a hollow retaining screw 9.

A plurality of such ceramic doublet assemblies 1 are spaced apart by interposed sections of semiflexible tube 10 which can also carry the electrical leads 11 so that an assembly of accurately spaced hydrophones results in which the ceramic doublet assemblies 1 are free of end pressure in the bobbin 4 and can therefore be enerized by vibration applied to the external surface 12 while the signal is collected at the junction 13 from the internal surface 14. A conductor 15 bridges the junction 13, the ceramic members 2-3 being bonded together at the junction 13.

After forming such a hydrophone sub assembly, the assembly as shown in FIG. 2 is positioned in an outer pressure wave transmitting tube 16, as shown in FIG. 3 resilient spacing members 17 being used where required, and the tube 16 is filled with potting medium 18 such as polyurethane so that the ceramic doublet assemblies 1 are held in the potting medium 18 and are free of end stress but accurately spaced and can be actuated by pressure waves which passed through the outer tube 16 and pass through the potting medium 18 to actuate the external surfaces 12 of the ceramic doublet assemblies 1 themselves.

The outer tube 16 has end caps 19 and 20 the cable 21 passing through the end cap 19 and being attached to the hydrophone assembly.

The outer tube 16 has mounting feet 22 on it whereby it can be mounted in a required position on a submarine or the like, which may be behind a sound-transparent window.

The two end flanges 6 and 7 are preferably joined together by a perforated hollow stem 23 on one end flange being engaged by the hollow retaining screw 9 on the other end flange.

Advantages of the invention, as well as relating to the structure, relate to the manufacturing technique which allows the apparently rigid structure to operate free of any resonances which would be normally associated with such a structure, and some of these advantages are:

1. Minimal amounts of P.E. welds which results in improved reliability,
2. Accurate spacing of ceramic element assemblies,
3. Simplicity of assembly and wiring as the ceramic element assemblies can be made up into the complete sub assembly and then tested prior to being potted.

As will be realized, the array can be towed by means of the cable 21 or can be fixed in place on a support by means of the feet 22.

The claims defining the invention are as follows:

We claim:

1. A distributed array hydrophone comprising an array of hydrophone elements positioned in a pressure wave transmitting tube so as to be actuated by pressure waves passing through said tube and having signal collecting means, each hydrophone element comprising a doublet assembly of abutting ceramic members which are hollow and radially oppositely polarized, said doublet assembly being held in a bobbin by two end flanges thereof engaging ends of said doublet assembly, the bobbin of one hydrophone element being connected by hollow resilient spacing members joined to said end flanges thereby forming said array, said array being encapsulated in a pressure wave transmitting potting medium in said tube wherein said doublet assembly has two ends engaged by the decoupling assembly which are in turn engaged by said two end flanges of the bobbin, whereby each doublet assembly is free to be actuated by pressure waves applied to an external surface of said doublet assembly whereby a signal can be received across a junction between said abutting ceramic members of said doublet assembly, and wherein said end flanges of each bobbin are joined by an axially positioned perforated hollow stem projecting from one of said end flanges and joined by a hollow retaining screw to a second of said end flanges whereby electrical leads attached to an internal surface of said ceramic members can be extended into a hollow of said axially positioned perforated hollow stem and then extended into and through said hollow resilient spacing members.

2. A distributed array hydrophone according to claim 1 wherein said ceramic members are bonded together at a junction to be coextensive, and in that said ends of said ceramic doublet assembly are held in said bobbin through resilient decoupling members disposed between said ends of said ceramic members and said end flanges, and electrical leads are attached to an internal surface of said ceramic members on each side of said junction, said junction being bridged on an external surface of said ceramic members by an electrical conductor.

3. A distributed array hydrophone according to claim 1 having mounting feet attached to said pressure wave transmitting tube.

4. A distributed array hydrophone according to claim 1 further including resilient spacers between said doublet assembly and said pressure wave transmitting tube.

5. A method of constructing a distributed array hydrophone comprising the steps of:
bonding together two coaxially positioned hollow radially oppositely polarized ceramic members to form a doublet assembly having a junction between said ceramic members;
confining said ceramic members between end flanges of a bobbin with interposed resilient decoupling assemblies;
securing electrical leads to said ceramic members on each side of said junction;
spacing an array of such doublet assemblies using resilient spacing members joined to said end flanges of said bobbin;
positioning said array of doublet assemblies and said resilient spacing members in a pressure wave transmitting tube; and
potting said array of doublet assemblies and said resilient spacing members in said pressure wave transmitting tube by a pressure wave transmitting potting medium
wherein said doublet assembly has two ends engaged by a decoupling assembly which are in turn engaged by said two end flanges of the bobbin, whereby each doublet assembly is free to be actuated by pressure waves applied to an external surface of said doublet assembly whereby a signal can be received across a junction between said abutting ceramic members of said doublet assembly, and wherein said end flanges of each bobbin are joined by an axially positioned perforated hollow stem projecting from one of said end flanges and joined by a hollow retaining screw to a second of said end flanges whereby electrical leads attached to an internal surface of said ceramic members can be extended into a hollow of said axially positioned perforated hollow stem and then extended into and through said hollow resilient spacing members.

6. A method according to claim 5 further comprising the step of:
defining the position of said doublet assemblies in said pressure wave transmitting tube by placing resilient spacing members between said ceramic doublet assemblies and said pressure wave transmitting tube before potting.

7. A method according to claim 5 further including the step of:
securing mounting feet to said pressure wave transmitting tube for mounting said distributed array hydrophone to a vessel.

8. A method according to claim 5 further comprising the steps of:
forming said pressure wave transmitting tube from a tube of plastic material; and
bonding caps to ends of said tube of plastic material to enclose said pressure wave transmitting potting medium.

9. A distributed array hydrophone adapted to be actuated by pressure waves comprising:
an array of ceramic doublet assemblies each assembly comprising abutting hollow members radially oppositely polarized;
bobbins, each bobbin holding a ceramic doublet assembly;
hollow resilient spacing members interconnecting said bobbins in spaced linear relationship;
a pressure wave transmitting tube encasing said bobbins and said resilient spacing members;
signal collecting means passing through said bobbins and said hollow resilient spacing members;
potting means encapsulating said bobbins and said hollow resilient spacing members in said pressure wave transmitting tube
wherein said doublet assembly has two ends engaged by the decoupling assembly which are in turn engaged by said two end flanges of the bobbin, whereby each doublet assembly is free to be actuated by pressure waves applied to an external surface of said doublet assembly whereby a signel can be received across a junction between said abutting ceramic members of said doublet assembly, and wherein said end flanges of each bobbin are joined by an axially positioned perforated hollow stem projecting from one of said end flanges and joined by a hollow retaining screw to a second of said end flanges whereby electrical leads attached to an internal surface of said ceramic members can be extended into a hollow of said axially positioned perforated hollow stem and then extended into and through said hollow resilient spacing members.

* * * * *